United States Patent
Isobe (10) Patent No.: US 11,657,490 B2
(45) Date of Patent: May 23, 2023

(54) CONTROL DEVICE FOR CONTROLLING MACHINE TOOL CAPABLE OF ALARM STOP AND NON-TRANSITORY COMPUTER READABLE MEDIUM RECORDING A PROGRAM

(71) Applicant: FANUC CORPORATION, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 17/079,633

(22) Filed: Oct. 26, 2020

(65) Prior Publication Data
US 2021/0158506 A1     May 27, 2021

(30) Foreign Application Priority Data
Nov. 21, 2019    (JP) .............................. JP2019-210495

(51) Int. Cl.
   *G06T 7/00*           (2017.01)
   *G05B 19/418*        (2006.01)
   *G05B 23/02*          (2006.01)

(52) U.S. Cl.
   CPC ........ *G06T 7/0004* (2013.01); *G05B 19/4183* (2013.01); *G05B 19/4185* (2013.01); *G05B 23/0283* (2013.01)

(58) Field of Classification Search
   CPC ............ G05B 19/4183; G05B 19/4185; G05B 23/0283; G05B 2219/37598; G05B 19/406; G05B 23/024; G06T 7/0004; B24B 49/18; H04N 7/18; G08B 21/187
   See application file for complete search history.

(56) References Cited

U.S. PATENT DOCUMENTS

| | | | |
|---|---|---|---|
| 9,069,347 B2* | 6/2015 | Kettemer | G05B 19/4061 |
| 10,890,892 B2* | 1/2021 | Maekawa | G05B 19/404 |
| 2008/0040058 A1* | 2/2008 | Fujii | B23K 31/125 |
| | | | 702/81 |
| 2017/0316560 A1* | 11/2017 | Grapsas | H04N 9/3179 |
| 2019/0362490 A1* | 11/2019 | Wen | G06N 20/00 |
| 2020/0026255 A1* | 1/2020 | Isobe | G05B 19/406 |
| 2022/0237767 A1* | 7/2022 | Okuno | B23Q 17/2409 |

FOREIGN PATENT DOCUMENTS

| | | | | |
|---|---|---|---|---|
| JP | 2019-042857 A | | 3/2019 | |
| JP | 2019042857 A | * | 3/2019 | |
| JP | 2022116122 A | * | 8/2022 | ......... B23Q 11/0042 |
| WO | WO-2020175308 A1 | * | 9/2020 | |

* cited by examiner

*Primary Examiner* — Emily C Terrell
*Assistant Examiner* — Ahmed A Nasher
(74) *Attorney, Agent, or Firm* — Studebaker & Brackett PC (57) ABSTRACT

A control device, which controls a machine tool capable of alarm stop based on abnormality in machining load, includes: a photographing unit which photographs chips produced as a result of machining of a workpiece; a reference model determination unit which determines in advance a reference model of chips for determining as abnormality in machining, based on images of chips photographed within a predetermined period before alarm stop, in response to an occurrence of alarm stop; and a judgment unit which judges as abnormality occurrence in machining, in a case of a degree of similarity in chips photographed at a predetermined timing in machining later, relative to a reference model of chips that was determined.

6 Claims, 5 Drawing Sheets

CONTROL DEVICE FOR CONTROLLING MACHINE TOOL CAPABLE OF ALARM STOP AND NON-TRANSITORY COMPUTER READABLE MEDIUM RECORDING A PROGRAM

This application is based on and claims the benefit of priority from Japanese Patent Application No. 2019-210495, filed on 21 Nov. 2019, the content of which is incorporated herein by reference.

BACKGROUND OF THE INVENTION

Field of the Invention

The present disclosure relates to a control device and a recording medium storing a program.

Related Art

Conventionally, a machine tool which machines a workpiece using a tool has been known. In a machine tool, for example, detecting an abnormality has been realized by monitoring the load on the tool or axis during machining as a machining load. On the other hand, even in a case of the machining load being within tolerance, abnormality may occur during machining. Therefore, a grinding machine has been proposed which photographs chips of the workpiece produced during machining, and detects the wear state of a grinding wheel using the change amount of the chips (for example, refer to Patent Document 1).

Patent Document 1: Japanese Unexamined Patent. Application, Publication No. 2019-42857

SUMMARY OF THE INVENTION

With the grinding machine disclosed in Patent Document 1, the chips collected in a chip aggregation device by coolant are photographed by a camera. In addition, with the grinding machine disclosed in Patent Document 1, it is determined whether the change amount for every fixed time of the chips contained in captured image data is at least a threshold. Then, with the grinding machine disclosed in Patent Document 1, in the case of the change amount being no more than the threshold, the dressing or replacement of the grinding wheel is prompted. According to Patent Document 1, it is thereby possible to grasp the wear state of the grinding stone.

However, in the machine tool, it has been known that an abnormality in machining is expressed in the change in chips produced by cutting the workpiece. Therefore, according to the change in chips washed away to a chip receiver such as a coolant tank using coolant, it is favorable so long as able to detect abnormality in machining from many more elements. In addition, it is more favorable if able to reduce the number of workpieces discarded due to abnormality in machining, by detecting abnormality in machining earlier than the alarm stop of the machine tool according to abnormality in the machining load.

A first aspect of the present disclosure relates to a control device which controls a machine tool capable of alarm stop based on abnormality in machining load, the control device comprising: a photographing unit which photographs chips produced as a result of machining of a workpiece; a reference model determination unit which determines in advance a reference model of chips for determining as abnormality in machining, based on images of chips photographed within a predetermined period before alarm stop, in response to an occurrence of alarm stop; and a judgment unit which judges as abnormality occurrence in machining, in a case of a degree of similarity in chips photographed at a predetermined timing in machining later, relative to a reference model of chips that was determined.

In addition, a second aspect of the present disclosure relates to a recording medium storing a program for causing a computer to operate as a control device which controls a machine tool capable of alarm stop based on abnormality in machining load, the program causing the computer to function as: a photographing unit which photographs chips produced as a result of machining of a workpiece; a reference model determination unit which determines in advance a reference model of chips for determining as abnormality in machining, based on images of chips photographed within a predetermined period before alarm stop; and a judgment unit which judges as abnormality occurrence in machining, in a case of a degree of similarity in chips photographed at a predetermined timing in machining later, relative to a reference model of chips that was determined.

According to the present disclosure, it is possible to provide a control device and a recording medium storing a program capable of detecting abnormality in machining from many more elements.

DETAILED DESCRIPTION OF THE INVENTION

Hereinafter, a control device 1 and program according to each embodiment of the present disclosure will be explained by referencing FIGS. 1 to 5. First, an outline of the control device 1 and a machine tool 100 controlled by the control device 1 according to each embodiment will be explained.

The machine tool 100 is a system which machines a workpiece W using a tool 101 (cutter). With the machine tool 100, for example, by deterioration of the tool 101, which is abnormality in the machining, occurring, the load in machining the workpiece W (hereinafter referred to as machining load) increases. Therefore, with the machine tool 100, suppressing breakage of the tool 101 or damage of the device is realized by monitoring the machining load. More specifically, in the case of the respective loads which are at least the threshold being detected, the machine tool 100 is alarm stopped.

The control device 1 determines abnormality in machining, using the change in chips produced by machining of the workpiece W in addition to the alarm stop. For example, the control device 1 determines abnormality in machining, using the change in chips flowing into a coolant tank 102 (refer to FIG. 2) by coolant. In addition, the alarm stop can occur before the determination of abnormality caused by the change in chips due to a difference of timing of alarm stop. Therefore, the control device 1 achieves determining the abnormality in machining before alarm stop, by optimizing the conditions for determining as abnormality in machining. It should be noted that "chip" is widely understood and is not limited to particles produced by cutting, and broadly includes powder produced by removal processing (e.g., grinding) other than cutting.

First Embodiment

Figure 1:
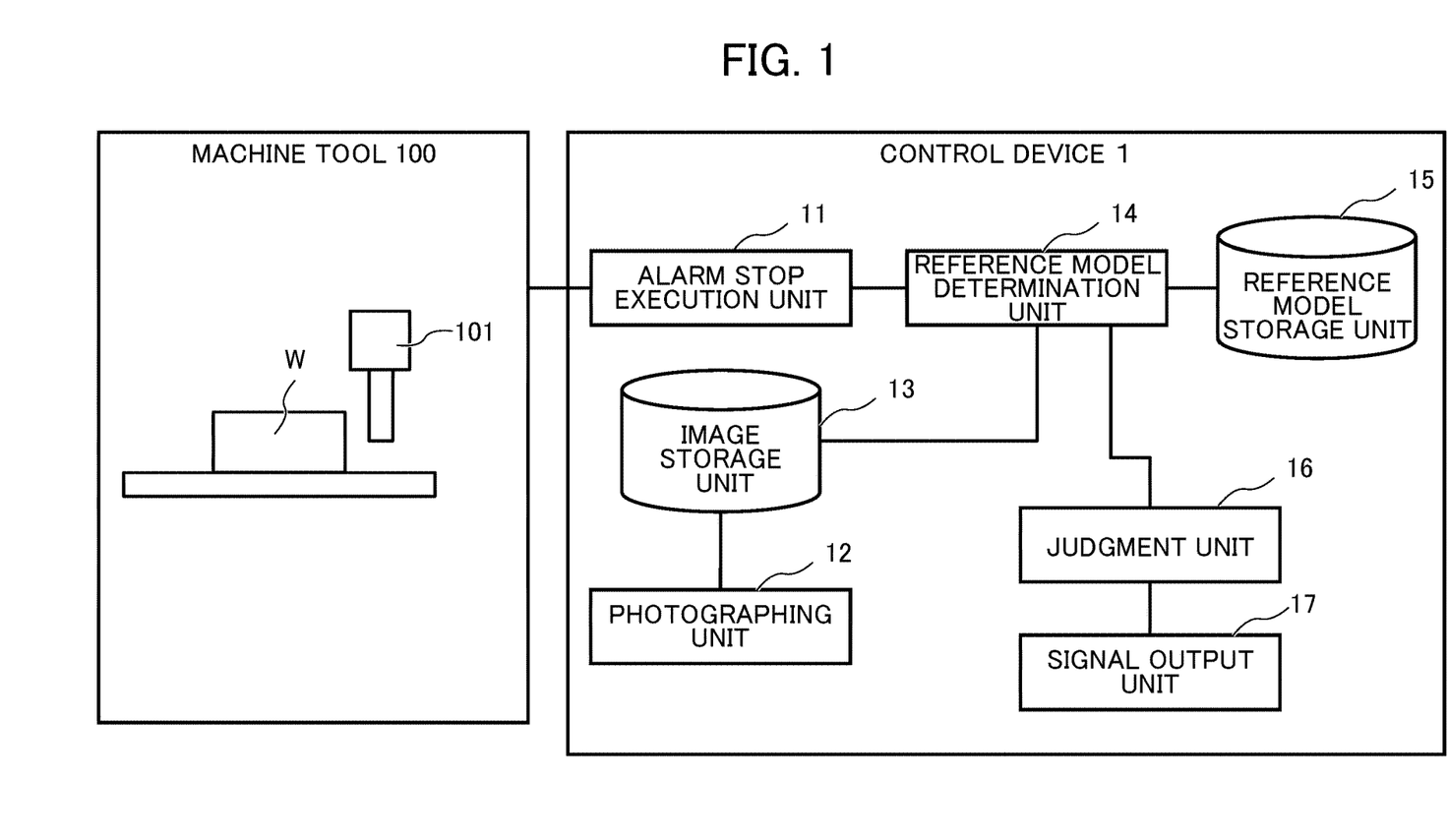
FIG. 1 is a block diagram showing the configuration of a working system including a control device according to a first embodiment of the present disclosure.

Next, the control device 1 and program according to a first embodiment of the present disclosure will be explained by referencing FIGS. 1 to 4. The control device 1 is a device capable of controlling machining operations of the machine tool 100. The control device 1, for example, is a device which controls the machine tool 100 capable of alarm stop, based on abnormality in the machining load of the machining device. The control device 1, as shown in FIG. 1, includes an alarm stop execution unit 11, photographing unit 12, image storage unit 13, reference model determination unit 14, reference model storage unit 15, judgment unit 16 and signal output unit 17.

The alarm stop execution unit 11 is realized by a CPU operating, for example. The alarm stop execution unit 11 determines alarm stop of the machine tool 100 based on the machining load of the machine tool 100. The alarm stop execution unit 11 detects at least a predetermined load on the tool 101 or an axis (not shown), using a sensor (not shown), for example. The alarm stop execution unit 11 sets the machine tool 100 to an alarm stop state by detecting at least a predetermined load on the tool 101 or axis.

Figure 2:
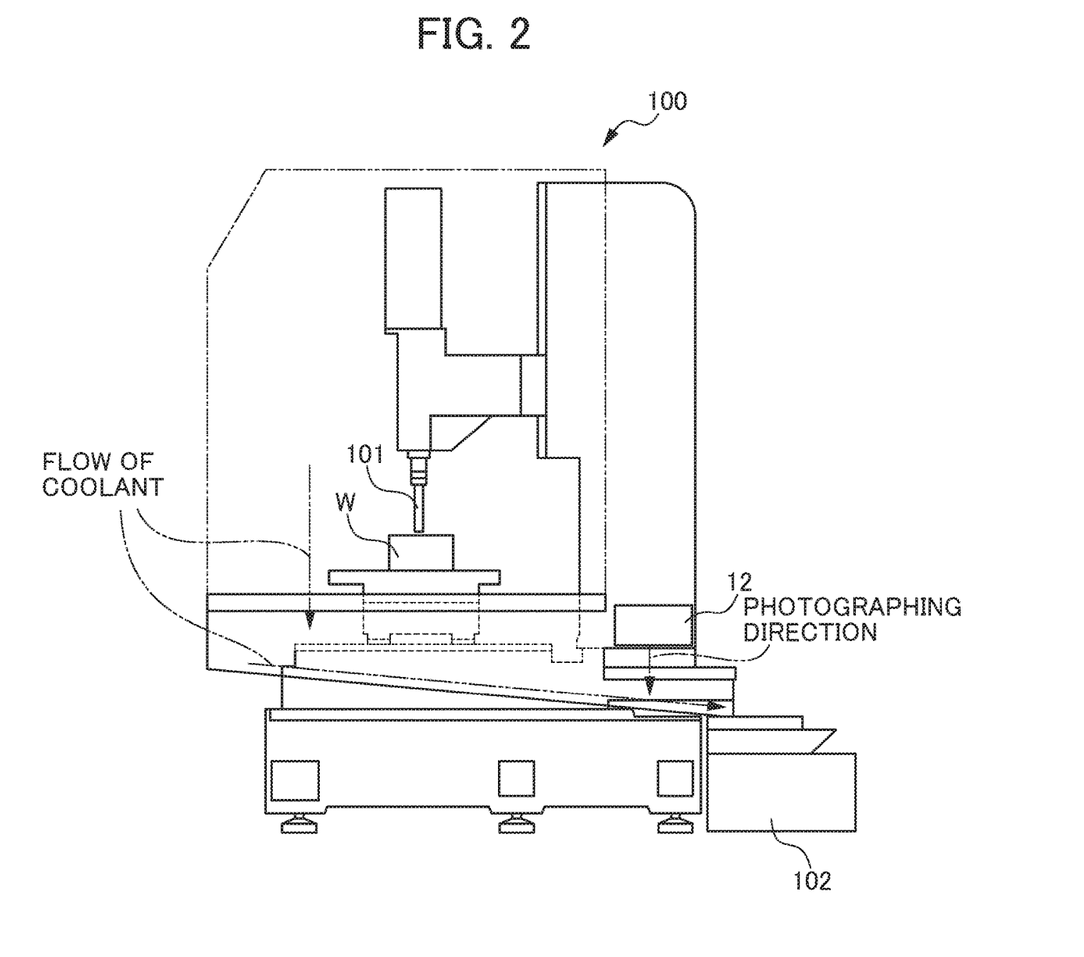
FIG. 2 is a schematic drawing showing the arrangement position of an image-capturing unit of a control device according to the first embodiment.

The photographing unit 12, for example, is an image capturing device such as a camera. The photographing unit 12 photographs the chips produced as a result of machining of the workpiece W. The photographing unit 12 photographs chips washed away to the coolant tank 102 by the coolant in the machining device, for example. The photographing unit 12, for example, is arranged directly above the flow channel flowing to the coolant tank 102, as shown in FIG. 2.

The image storage unit 13 is a secondary storage medium such as a hard dish, for example. The image storage unit 13 stores images (moving images) photographed by the photographing unit 12. In addition, the image storage unit 13 stores the photographing time together with the photographed image.

The reference model determination unit 14 is realized by a CPU operating, for example. The reference model determination unit 14 determines in advance a reference model of chips for deciding an abnormality in machining, based on images of chips photographed within a predetermined period before the alarm stop, in response to the generation of alarm stop. The reference model determination unit 14, for example, operates with the execution of the alarm stop of the machine tool 100 according to the alarm stop execution unit 11 as a trigger. In the present embodiment, the reference model determination unit 14 determines an average value for the size of chips included in the image of chips photographed within a predetermined period before the alarm stop time as a reference model. In other words, the reference model determination unit 14 determines the size of chips produced within a predetermined period before alarm stop, as a reference model for judging abnormality occurrence. Herein, the reference model determination unit 14 calculates, as the size of chips, the average value of each pixel amount for a plurality of chips included in an image of chips as the size of chips, for example.

In addition, the reference model determination unit 14 compensates the reference model being determined, based on the image of chips photographed within a predetermined period before a new alarm stop, in response to a new occurrence of alarm stop. The reference model determination unit 14 compensates the reference model being determined, with the occurrence of a new alarm stop as a trigger, for an alarm stop occurring at least once already, for example. In other words, the reference model determination unit 14, in the case of not being able to detect by detection of an abnormality in machining done using the reference model determined already by the judgment unit 16 described later, compensates the reference model which was already determined, with the alarm stop newly occurring as a trigger. The reference model determination unit 14, for example, in the occurrence of a new alarm stop, determines a compensation model for compensating the reference model using an image of chips photographed within a predetermined period before a new alarm stop. The reference model determination unit 14, for example, compensates the reference model being determined already so as to define the average value for the size of the reference model already determined and the compensation model, as a new reference model.

The reference model storage unit 15 is a secondary storage medium such as a hard disk, for example. The reference model storage unit 15 stores a reference model determined by the reference model determination unit 14. The reference model storage unit 15 stores the reference model for the size of chips determined, for example.

The judgment unit 16, for example, is realized by a CPU operating. The judgment unit 16, in a case of the degree of similarity of chips photographed at a predetermined timing in later machining being at least a predetermined amount, relative to the determined reference model, judges as abnormality occurrence in machining. The judgment unit 16, for example, calculates the average value for the size of chips included in each of the images photographed by the photographing unit 12 repeatedly at a predetermined timing, during machining of the workpiece W. The judgment unit 16 calculates the degree of similarity by comparing between the average value for the size of chips calculated, and the size of chips in the reference model determined. The judgment unit 16 judges as the abnormality occurrence in machining, in the case of the calculated degree of similarly being at least a predetermined value. Herein, the judgment unit 16, for example, calculates the average value of each pixel amount as the size of chips, for a plurality of chips included in an image of chips, as the size of chips, similarly to the reference model determination unit 14.

The signal output unit 17 is realized by a CPU operating, for example. The signal output unit 17 outputs a signal indicating the occurrence of abnormality in machining, in a case of being judged as having abnormality in machining by the judgment unit 16. The signal output unit 17, for example, causes a signal indicating the occurrence of abnormality in machining to be displayed on a display device (not shown) such as a display, as a display image.

Figure 3:
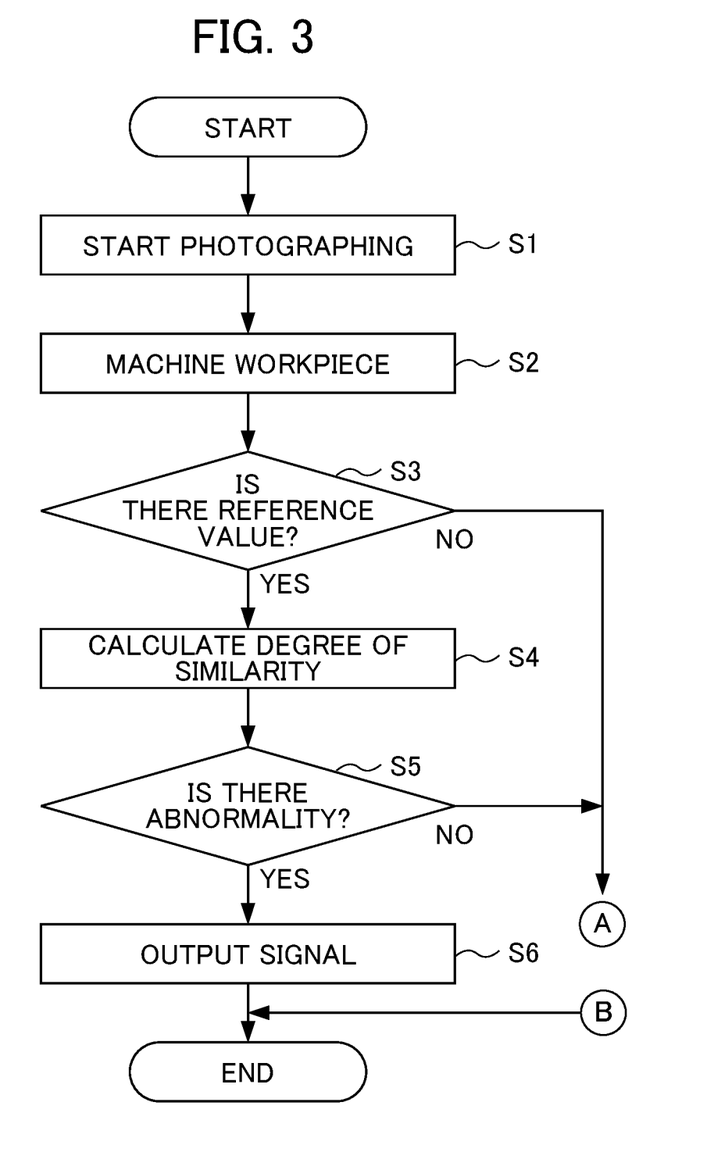
FIG. 3 is a flowchart showing operation of the control device according to the first embodiment.
Figure 4:
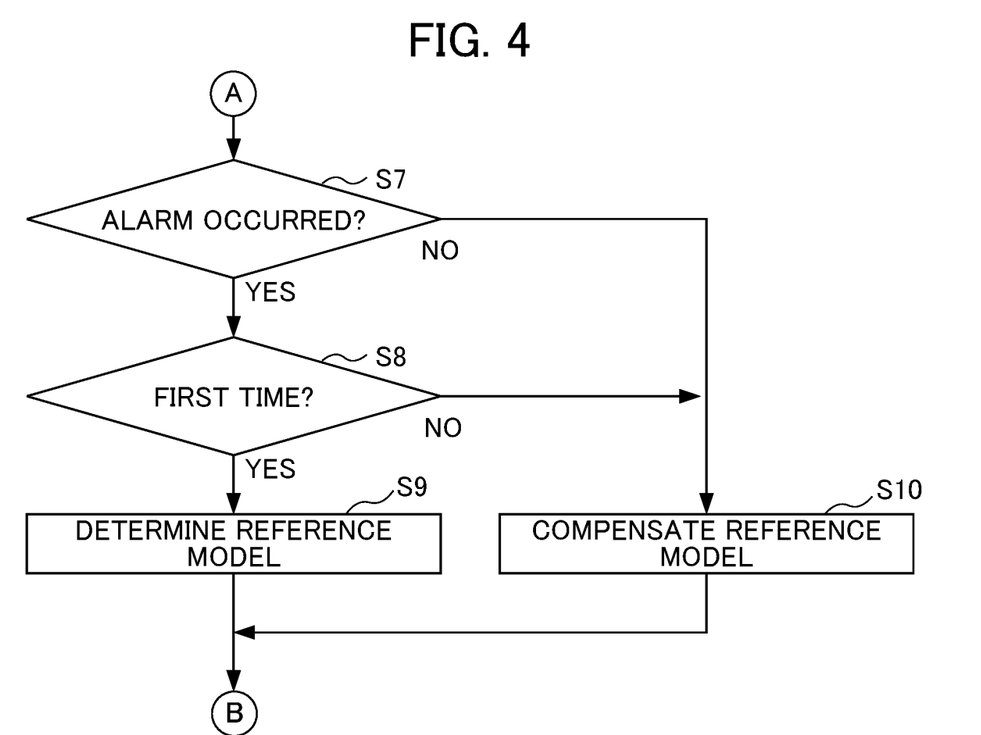
FIG. 4 is a flowchart showing operation of the control device according to the first embodiment.

Next, the flow of operation of the control device 1 according to the present embodiment will be explained by referencing the flowchart of FIG. 3. First, the photographing unit 12 starts photographing of chips produced by machining of the workpiece W (Step S1). The photographing unit 12 stores the photographed images in the image storage unit 13 to be associated with the photographing time. Next, the machine tool 100 starts machining of the workpiece W (Step S2).

Next, the judgment unit 16 judges whether determination of the reference model is already being executed by the reference model determination unit 14 (Step S3). The judgment unit 16, for example, judges whether the reference model is being stored in the reference model storage unit 15. In the case of the determination of the reference model already being executed (Step S3: YES), the processing advances to Step S4. On the other hand, in the case of the determination of the reference model not being executed yet (Step S3: NO), i.e. case of alarm stop not occurring once yet, the processing advances to Step S7.

In Step S4, the judgment unit 16 calculates the average value for the size of chips included in the image photographed by the photographing unit 12. The judgment unit 16 calculates the average value for the pixel number of a plurality of chips as the average value for the size of chips, for example. Then, the judgment unit 16 calculates the degree of similarity between the calculated average value and the size of the reference model being determined.

Next, the judgment unit 16 determines whether there is abnormality in the average value for the size calculated (Step S5). The judgment unit 16, for example, judges as being an abnormality in machining, in the case of the calculated degree of similarity being at least a predetermined value. In the case of the judgment unit 16 judging as being an abnormality (Step S5: YES), the processing advances to Step S6. On the other hand, in the case of the judgment unit 16 judging as not being an abnormality (Step S5: NO), the processing advances to Step S7.

In Step S6, the signal output unit 17 outputs a signal indicating the occurrence of abnormality in machining. The signal output unit 17, for example, causes a display indicating the occurrence of abnormality in machining to be displayed on a display device. In addition, the alarm stop execution unit 11 causes machining operation of the machine tool 100 to stop. The processing according to the present flow thereby ends.

In Step S7, the alarm stop execution unit 11 judges the existence/absence of the occurrence of alarm stop in the machine tool 100. In the case of alarm stop occurring (Step S7: YES), the processing advances to Step S8. On the other hand, in the case of alarm stop not occurring (Step S7: NO), the processing returns to Step S10.

In Step S8, the reference model determination unit 14 judges whether being the first time for the occurrence of alarm stop. The reference model determination unit 14, for example, in a case of the reference model not being stored in the reference model storage unit 15, judges the occurrence of alarm stop as a first time. In the case of the occurrence of alarm stop being the first time (Step S8: YES), the processing advances to Step S9. On the other hand, in the case of the occurrence of alarm stop not being the first time (Step S8: NO), the processing advances to Step S10.

In Step S9, the reference model determination unit 14 determines the average value for the size of chips within a predetermined period before alarm stop as the reference model. The present flow thereby ends.

In Step S10, the reference model determination unit 14 uses the average value for the size of chips within a predetermined period before alarm stop, and compensates the reference model already being determined. The reference model determination unit 14, for example, compensates an existing reference model so as to define the average value of the existing reference model and the compensation model newly calculated as a new reference model. The processing of the present flow thereby ends.

Next, a program according to the present embodiment will be explained. Each configuration included in the control device 1 can be respectively realized by hardware, software or a combination of these. Herein, being realized by software indicates the matter of being realized by a computer reading and executing a program.

The program can be stored using various types of non-transitory computer readable media, and supplies to the computer. Non-transitory computer readable medium includes various types of tangible storage media. Examples of non-transitory computer readable media include magnetic recording media (e.g., flexible disk, magnetic tape, hard disk drive), magneto-optical recording media (e.g., magneto-optical disk), CD-ROM (Read Only Memory), CD-R, CD-R/W and semiconductor memory (e.g., mask ROM, PROM (programmable ROM), EPROM (Erasable PROM), flash ROM, RAM (random access memory)). In addition, the display program may be supplied to the computer by way of various types of transitory computer readable media. Examples of transitory computer readable media include electrical signals, optical signals and electromagnetic waves. Transitory computer readable media can supply programs to the computer via wired communication paths such as electric wires and optical fiber, or wireless communication paths.

According to the control device 1 and program according to the first embodiment above, the following effects are exerted. (1) The control device 1 which controls the machine tool 100 capable of alarm stop based on abnormality in machining load, includes: a photographing unit 12 which photographs chips produced as a result of machining of a workpiece W; a reference model determination unit 14 which determines in advance a reference model of chips for determining as abnormality in machining, based on images of chips photographed within a predetermined period before alarm stop, in response to an occurrence of alarm stop; and a judgment unit 16 which judges as abnormality occurrence in machining, in a case of a degree of similarity in chips photographed in machining later, relative to a reference model of chips that was determined. In addition, a program for causing a computer to operate as a control device 1 which controls a machine tool 100 capable of alarm stop based on abnormality in machining load, causes the computer to function as: a photographing unit 12 which photographs chips produced as a result of machining of a workpiece W; a reference model determination unit 14 which determines in advance a reference model of chips for determining as abnormality in machining, based on images of chips photographed within a predetermined period before alarm stop; and a judgment unit 16 which judges as abnormality occurrence in machining, in a case of a degree of similarity in chips photographed in machining later, relative to a reference model of chips that was determined. The detecting of abnormality in machining thereby becomes possible from many more elements, in addition to machining load. Therefore, the possibility of being able to detect abnormality in machining prior to alarm stop increases. So long as possible to detect abnormality in machining earlier, it is favorable in the point of being able to suppress the damage, etc. of the tool 101 or machine tool 100. For example, by suppressing a piece of the tool 101 or workplace W caused by abnormality in the machining load from flowing into the coolant tank 102, it is possible to suppress damage of a pump or chip conveyor of the coolant tank 102 ahead of time. In addition, by detecting abnormality in machining early, it is possible to reduce the scrapped amount of the workpiece W.

(2) The reference model determination unit 14 compensates the reference model being determined, based on images of chips photographed within a predetermined period before new alarm stop, in response to the new occurrence of the alarm stop. The accuracy of being able to detect abnormality in machining prior to alarm stop thereby increases. Therefore, it is possible to improve the dependability of the control device 1 and the machine tools 100 controlled by the control device 1.

Second Embodiment

Figure 5:
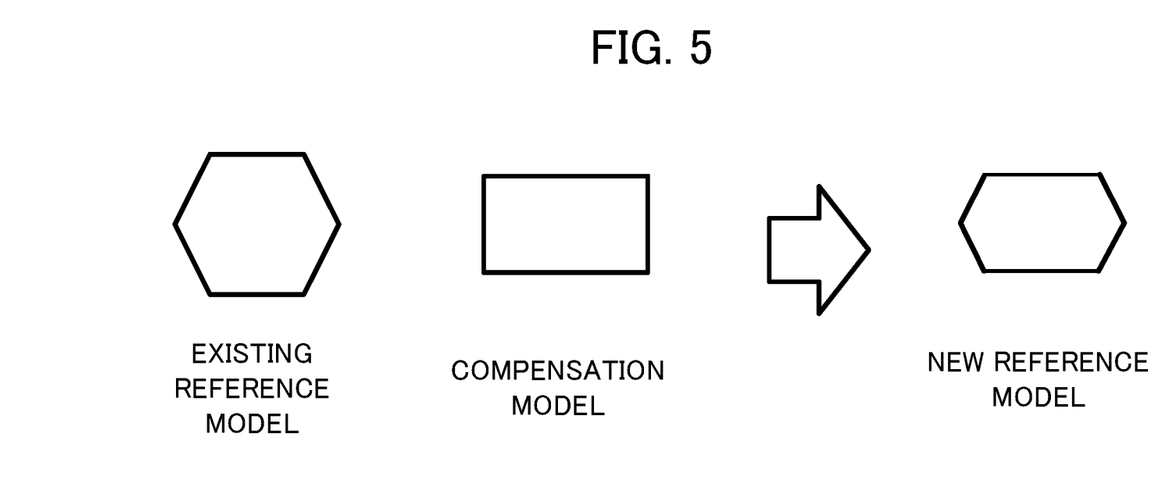
FIG. 5 is a schematic drawing showing the shapes of chips used in reference model determination by a reference model determination unit of a control device according to a second embodiment of the present disclosure.

Next, a control device 1 and program according to a second embodiment of the present disclosure will be explained by referencing FIG. 5. Upon explanation of the second embodiment, the same reference symbols will be attached to constituent elements that are identical to the aforementioned embodiment, and explanation thereof will be omitted or simplified. The control device 1 of the second embodiment differs from the first embodiment in the point of the reference model determination unit 14 determining the average value for the shape of chips included in images of chips photographed within a predetermined period before the alarm stop, as the reference model. In addition, the control device 1 of the second embodiment differs from the first embodiment in the point of the reference model determination unit 14 compensating the reference model already being determined, so that an overlapping portion of the shape of chips related to the reference model already determined and the shape of chips of the compensation model by the occurrence of a new alarm stop becomes the reference model, as shown in FIG. 5. In addition, the control device 1 of the second embodiment differs from the first embodiment, in the point of the judgment unit 16 acquiring the shape of chips from images photographed by the photographing unit 12 during machining of the workpiece W. In addition, the control device 1 of the second embodiment differs from the first embodiment in the point of the judgment unit 16 judging as abnormality occurrence in machining, in a case of the degree of similarity between the shape of chips acquired and the shape of chips shown by the reference model being at least a predetermined value.

According to the control device 1 and program according to the second embodiment above, the following effects are exerted. The reference model determination unit 14 determines the shape of chips as a reference model. In addition, the judgment unit 16 judges abnormality occurrence in machining, in a case of the degree of similarity between the shape of chips acquired and the shape of chips shown by the reference model being at least a predetermined value. It is thereby possible to judge abnormality occurrence in machining from another viewpoint. Since it is possible to increase the techniques for judging abnormality in machining, a more universal control device 1 and program can be provided.

Third Embodiment

Next, a control device 1 and program according to a third embodiment of the present disclosure will be explained. Upon explanation of the third embodiment, the same reference symbols will be attached to constituent elements that are identical to the aforementioned embodiment, and explanation thereof will be omitted or simplified. The control device 1 according to the third embodiment differs from the first embodiment in the point of the reference model determination unit 14 determining a transition in the change amount (change rate) of the size of chips included in an image of chips photographed within a predetermined period before alarm stop, as a reference model. In addition, the control device 1 of the third embodiment differs from the first embodiment in the point of the reference model determination unit 14 compensating the reference model already determined so that an average value between transition of the change amount of the size of chips related to the reference model already determined and the transition of change amount of the size of chips of the compensation model according to the occurrence of a new alarm stop is defined as a new reference model. In addition, the control device 1 of the third embodiment differs from the first embodiment in the point of the judgment unit 16 acquiring the transition of change amount of the size of chips within a predetermined period, from an image photographed by the photographing unit 12 during machining of the workpiece In addition, the control device 1 of the third embodiment differs from the first embodiment in the point of the judgment unit 16 judging as abnormality occurrence in machining, in a case of the degree of similarity between transition of the change amount, of chips acquired and the transition of change amount of chips indicated by the reference model being at least a predetermined value.

According to the control device 1 and program related to the third embodiment, above, the following effects are exerted. The reference model determination unit 14 determines the transition in change amount of the size of chips as the reference model. In addition, the judgment unit 16 judges abnormality occurrence in machining in a case of the degree of similarity between the transition in change amount of the size of chips acquired and the transition in change amount of the size of chips indicated by the reference model being at least a predetermined value. It is thereby possible to judge abnormality occurrence in machining from another viewpoint. Since it possible to increase the techniques for judging abnormality in machining, a more universal control device 1 and program can be provided.

Fourth Embodiment

Next, a control device 1 and program according to a fourth embodiment of the present disclosure will be explained. Upon explanation of the fourth embodiment, the same reference symbols will be attached to constituent elements that are identical to the aforementioned embodiment, and explanation thereof will be omitted or simplified. The control device 1 according to the fourth embodiment differs from the first to third embodiments in the point of the reference model determination unit 14 further compensating the reference model being determined, based on images of chips photographed within a predetermined period before alarm stop of another machine tool 100. In other words, the reference model determination unit 14 differs from the first to third embodiments in a point of determining a reference model to be shared with a plurality of machine tools 100, using the reference model before alarm stop of a plurality of the machine tools 100. The reference model determination unit 14, for example, determines a shared reference model, by repeating compensation using the reference model of another machine tool 100 relative to the reference model of one machine tool 100, as in the reference model determination unit 14 according to the above first to third embodiments, for example.

According to the control device 1 and program related to the fourth embodiment above, the following effects are exerted. (3) The reference model determination unit 14 further compensates the reference model being determined, based on images of chips photographed within a predetermined period before alarm stop of another machine tool 100. It the reference model is being determined by one device, it is thereby possible to use the reference model even in machine tools 100 in which alarm stop has not occurred. Therefore, it is possible to further stabilize operation of a plurality of the machine tools 100.

Fifth Embodiment

Next, a control device 1 and program according to a fifth embodiment of the present disclosure will be explained. Upon explanation of the fifth embodiment, the same reference symbols will be attached to constituent elements that are identical to the aforementioned embodiment, and explanation thereof will be omitted or simplified. The control device 1 according to the fifth embodiment differs from the first to fourth embodiments in the point of the reference model determination unit 14 determining a new reference model, based on images of chips photographed within a predetermined period before a new alarm stop, in response to a new occurrence of alarm stop. In addition, the control device 1 according to the fifth embodiment differs from the first to fourth embodiments in the point of the judgment unit 16 compensating the degree of similarity determined as abnormality occurrence in machining, so as to include the new reference model.

According to the control device 1 and program related to the fifth embodiment above, the following effects are exerted. (4) The reference model determination unit 14 determines a new reference model, based on images of chips photographed within a predetermined period before a new alarm stop, in response to a new occurrence of alarm stop, and the judgment unit 16 compensates the degree of similarity for judging as an abnormality occurrence of machining, so as to include the new reference model. It is thereby possible to optimize the degree of similarity for judging as abnormality occurrence in machining. Therefore, it is possible to improve the possibility of detecting the abnormality occurrence of machining before alarm stop.

Although each of the preferred embodiments of the control device and program of the present disclosure have been explained above, the present disclosure is not limited to the aforementioned embodiment, and modifications are possible where appropriate.

For example, the photographing unit 12 may be configured to be mobile within the machine tool 100 in the above-mentioned embodiment. The photographing unit 12 may be configured to be mobile by an automatic conveying device (not shown) including a robot. The photographing unit 12, for example, may be configured so that the resolution, photographing interval, position, posture, etc. are adjusted in response to the machining program during execution. In other words, the photographing unit 12 may be optimized in position so as to be able to photograph more chips in addition, in the photographing unit 12, the photographing conditions may be optimized by machine learning. In particular, in the photographing unit 12, the photographing conditions may be optimized in association with the timing of alarm occurrence of the machine tool 100 or peripheral equipment.

In addition, in the above-mentioned embodiments, in the case of the judgment unit 16 judging that the degree of similarity is lower than judging as abnormality but higher than a predetermined value, the photographing unit 12 may be configured so as to photograph chips in a shorter timing. Since it is thereby possible to increase the detection precision of abnormality occurrence in machining, the reliability of the control device 1 can be increased.

In addition, in the above-mentioned embodiments, the reference model determination unit 14 may determine the reference model for the variation in the size of chips included in the photographed image. The judgment unit 16 may judge as an abnormality occurrence in machining, in a case of the variation in the size of chips included in the image photographed during machining becoming at least a predetermined degree of similarity relative to the reference model.

In addition, each of the above-mentioned embodiments may be combined in any way so long as being realizable. For example, the judgment unit 16 may judge abnormality occurrence in machining using two or more types of reference models. It is thereby possible to improve the precision in detecting abnormality. In addition, in each of the above-mentioned embodiments, the control device may be configured integrally with the machine tool or separately.

EXPLANATION OF REFERENCE NUMERALS

1 control device
11 alarm stop execution unit
12 photographing unit
14 reference model determination unit
16 judgment unit
100 machine tool
W workpiece

What is claimed is:

1. A control device which controls a machine tool capable of alarm stop based on abnormality in machining load, the control device comprising:
    a camera which photographs chips produced as a result of machining of a workpiece; and
    a processor, the processor being configured to:
    determine in advance a reference model of chips for determining as abnormality in machining, based on images of chips photographed within a predetermined period before alarm stop; and
    judge as abnormality occurrence in machining, in a case of a degree of similarity in chips photographed at a predetermined timing in machining later, relative to the reference model of chips that was determined, wherein
    the processor initiates compensating the reference model being determined, based on images of chips photographed within a predetermined period before a new alarm stop, in response to an occurrence of the new alarm stop.

2. The control device according to claim 1, wherein the processor further compensates the reference model being determined, based on images of chips photographed within a predetermined period before an alarm stop of another machine tool.

3. A non-transitory computer readable medium storing a program for causing a computer to operate as a control device which controls a machine tool capable of alarm stop based on abnormality in machining load, the program causing the computer to function as:
    a photographing unit which photographs chips produced as a result of machining of a workpiece;
    a reference model determination unit which determines in advance a reference model of chips for determining as abnormality in machining, based on images of chips photographed within a predetermined period before alarm stop, in response to an occurrence of alarm stop; and a judgment unit which judges as abnormality occurrence in machining, in a case of a degree of similarity in chips photographed at a predetermined timing in machining later, relative to the reference model of chips that was determined, wherein the reference model determination unit initiates compensating the reference model being determined, based on images of chips photographed within a predetermined period before a new alarm stop, in response to an occurrence of the new alarm stop.

4. The control device according to claim 1, wherein the processor determines the reference model based on an average value of sizes of chips included in the images photographed within a predetermined period.

5. The control device according to claim 1, wherein the processor determines the reference model based on an average value of shapes of chips included in the images photographed within a predetermined period.

6. The control device according to claim 5, wherein the processor determines a new reference model based on images of chips photographed within a predetermined period before the new alarm stop, in response to the occurrence of the new alarm stop, and initiates compensating the reference model based on overlapping portion of the shapes of chips related to the reference model already determined and shape of chips related to the new reference model.

\* \* \* \* \*